(12) United States Patent
Guo et al.

(10) Patent No.: US 9,083,323 B2
(45) Date of Patent: Jul. 14, 2015

(54) INTEGRATED CIRCUIT IDENTIFICATION AND DEPENDABILITY VERIFICATION USING RING OSCILLATOR BASED PHYSICAL UNCLONABLE FUNCTION AND AGE DETECTION CIRCUITRY

(71) Applicant: QUALCOMM Incorporated, San Diego, CA (US)

(72) Inventors: Xu Guo, San Diego, CA (US); Brian M. Rosenberg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 13/764,507

(22) Filed: Feb. 11, 2013

(65) Prior Publication Data
US 2014/0225639 A1 Aug. 14, 2014

(51) Int. Cl.
| | |
|---|---|
| *H03K 3/03* | (2006.01) |
| *H03K 5/156* | (2006.01) |
| *H05K 13/00* | (2006.01) |
| *H03K 3/84* | (2006.01) |
| *H04L 9/32* | (2006.01) |

(52) U.S. Cl.
CPC ............. *H03K 3/0315* (2013.01); *H03K 3/84* (2013.01); *H03K 5/156* (2013.01); *H04L 9/3278* (2013.01); *H05K 13/00* (2013.01); *H04L 2209/12* (2013.01); *Y10T 29/49117* (2015.01)

(58) Field of Classification Search
USPC .................. 326/8; 331/46, 49, 57; 327/99
See application file for complete search history.

(56) References Cited

U.S. PATENT DOCUMENTS

| | | |
|---|---|---|
| 2005/0134394 A1 | 6/2005 | Liu |
| 2010/0031065 A1 | 2/2010 | Futa et al. |
| 2011/0066670 A1 | 3/2011 | Yu et al. |
| 2011/0173432 A1 | 7/2011 | Cher et al. |

FOREIGN PATENT DOCUMENTS

EP    2081170 A1    7/2009

OTHER PUBLICATIONS

Mansouri et al. "Ring Oscillator Physical Unclonable Function with Multi Level Supply Voltages", Jul. 17, 2012, pp. 1-7.*
International Search Report and Written Opinion—PCT/US2014/014896—ISA/EPO—Apr. 15, 2014.

(Continued)

*Primary Examiner* — Daniel D Chang
(74) *Attorney, Agent, or Firm* — Loza & Loza, LLP

(57) ABSTRACT

One feature pertains to an integrated circuit (IC) that includes a first plurality of ring oscillators configured to implement, in part, a physically unclonable function (PUF). The IC further includes a second plurality of ring oscillators configured to implement, in part, an age sensor circuit, and also a ring oscillator selection circuit that is coupled to the first plurality of ring oscillators and the second plurality of ring oscillators. The ring oscillator selection circuit is adapted to select at least two ring oscillator outputs from at least one of the first plurality of ring oscillators and/or the second plurality of ring oscillators. Notably, the ring oscillator selection circuit is commonly shared by the PUF and the age sensor circuit. Also, the IC may further include an output function circuit adapted to receive and compare the two ring oscillator outputs and generate an output signal.

44 Claims, 9 Drawing Sheets

(56) References Cited

OTHER PUBLICATIONS

Kim T-H., et al., "Silicon Odometer: An On-Chip Reliability Monitor for Measuring Frequency Degradation of Digital Circuits", IEEE Journal of Solid-State Circuits, IEEE Service Center, Piscataway, NJ, USA, vol. 43, No. 4, Apr. 1, 2008, pp. 874-880, XP011206688, ISSN: 0018-9200, p. 875, left-hand column, paragraph 3-right-hand column, paragraph 1; figure 2.

Koushanfar, F., et al., "Can EDA combat the rise of electronic counterfeiting?", Design Automation Conference (DAC), 2012 49th ACM/EDAC/IEEE, IEEE, Jun. 3, 2012, pp. 133-138, XP032204580, ISBN: 978-1-4503-119-1, p. 135, left-hand column, paragraph 4, p. 136, left-hand column, paragraph 3, p. 136, right-hand column, paragraph 5.

Suh G.E., et al., "Physical Unclonable Functions for Device Authentication and Secret Key Generation", 2007 44th ACM/IEEE Design Automation Conference : San Diego, CA, Jun. 4-8, 2007, IEEE, Piscataway, NJ, Jun. 1, 2007, pp. 9-14, XP031183294, ISBN: 978-1-59593-627-1, p. 10, right-hand column, paragraph 6—p. 11, left-hand column, paragraph 1; figure 2.

Eiroa Susana, et al.; "Circuit Authentication based on Ring-Oscillator PUFs", Dept. Electronics & Electromagnetism (University of Seville), Microelectronics Institute of Seville; May 2011, pp. 691-694; 978-1-4577-1846-5/11 © 2011 IEEE.

Maiti, Abhranil, et al.; "The Impact of Aging on an FPGA-based Physical Unclonable Function"; 2011 21st International Conference on Field Programmable Logic and Applications; 2011, pp. 152-156.

* cited by examiner

INTEGRATED CIRCUIT IDENTIFICATION AND DEPENDABILITY VERIFICATION USING RING OSCILLATOR BASED PHYSICAL UNCLONABLE FUNCTION AND AGE DETECTION CIRCUITRY

BACKGROUND

1. Field

Various features relate to integrated circuits, and more specifically, to integrated circuit (IC) identification (ID) and IC dependability verification using ring oscillator based physical unclonable function and age detection circuitry.

2. Background

In the era of pervasive computing a lot of security issues exist related to software copyright protection, counterfeit ICs (i.e., chips), and system reliability. Software protection is a family of computer security techniques that are used to prevent the unauthorized copying of software. In other words, software must be able to determine whether the user is properly licensed to use it, and run only if this is the case. Another problem related to software protection is how to identify whether the chip or platform, on which the software is running, is a counterfeit chip. Counterfeit chips have proliferated throughout the industry and are a risk to the electronics supply chain. Consequently, identifying and restricting the usage of counterfeit chips in the electronics supply chain is vital.

An on-chip Physical Unclonable Function (PUF) is a chip-unique challenge-response mechanism exploiting manufacturing process variations inside ICs. The relationship between a challenge and the corresponding response is determined by complex, statistical variations in logic and interconnects in the IC. Different PUF implementations in ICs may be found in the prior art. For example, a ring-oscillator based PUF exploits manufacturing process variations of the IC that cause random but static variations in the frequency of identically laid-out ring oscillators.

FIG. 1 illustrates a schematic block diagram of one example of a ring oscillator based PUF circuit 102 found in the prior art. A plurality of ring oscillators (ROs) 104 may be concurrently enabled and their outputs are sent to two or more switches (multiplexers) 106, 108. A challenge serves as an input to the switches 106, 108 which causes each switch 106, 108 to then select a single RO from among the plurality of ROs 104. The challenge sent to the switches 106, 108 is designed such that each switch 106, 108 selects a different RO. The selected ROs each have a slightly different resonating frequency associated with them due to slight manufacturing variations at the semiconductor level even though each may have been manufactured in an attempt to make them identical. The PUF output response is generated by a pairwise comparison 114 of these selected ring oscillators' frequencies as measured/stored by the counters 110 and 112. For example, if the first counter 110 detects a higher frequency than the second counter 112, then a logical "1" may be generated, otherwise a logical "0" may be generated. In this fashion the comparisons made represent a challenge/response mechanism, where the chosen RO pair is the challenge and the RO frequency comparison result is the response.

Ideally, each RO pair selected as a challenge will generate a unique response. The response generated should not be able to be determined ahead of time based on the challenge input. Moreover, the same challenge input into the PUF should generate the same response output every time. However, among other things, over time and use one or more of these properties may not hold true. For example, over time one RO's frequency may slow down due to overuse and the same challenge input may generate a different response output (e.g., a logical "1" may flip to a "0").

An RO-based PUF circuit like the one described above may be used to generate a chip identifier number. However, a chip identification security system that merely relies on a chip identifier number generated merely in this way is inherently limited.

As CMOS process technology continues to follow an aggressive scaling roadmap, designing reliable circuits has become ever more challenging with each technological milestone. Reliability issues such as bias temperature instability (BTI), hot carrier injection (HCI), and time-dependent dielectric breakdown (TDDB) have become more prevalent as the electrical field continues to increase in nano-scale CMOS devices. One of the most pressing of these challenges is negative bias temperature instability (NBTI) caused by the trap generation in the Si—SiO interface of PMOS transistors. Consequently, precise measurement of digital circuit degradation is a key aspect of designing aging-tolerant circuits.

FIG. 2 illustrates a schematic block diagram of an IC age sensor circuit 200 found in the prior art. Two RO 202, 204 outputs are coupled to a phase comparator 206 that determines the frequency difference $f_{diff}$ between the ROs 202, 204. The first RO 202 (e.g., $RO_{STR}$) is "stressed" because it is almost always powered ON (i.e., it is continuously operating) with a supply voltage level $V_{DD\text{-}STR}$, which is greater than the nominal supply voltage $V_{DD}$ of the chip. By contrast, the second RO 204 (e.g., $RO_{REF}$) is typically powered OFF (i.e., it is not operational). Then, during times where a measurement is desired, both ROs are rendered operational (i.e., turned ON) at the nominal supply voltage $V_{DD}$ and the frequency difference between the ROs 202, 204 is measured by the phase comparator 206. Over time, the stressed RO's 202 operational frequency will decrease relative to the unstressed RO's 204 operational frequency (i.e., $f_{diff}$ will increase). The age of the IC age sensor circuit 200, and thus in turn the age of a larger circuit on which the sensor circuit 200 resides, may then be determined by analyzing the amount by which $f_{diff}$ increases over time.

Each of the circuits described above occupy precious chip area on the active surface of an IC. Thus, an improved circuit design that can extract the benefits afforded by PUF security circuits and IC age sensor circuits with a reduction in chip area needed to implement such systems is valuable. Moreover, there is always a need for increased capabilities of a system to identify counterfeit chips and perform chip health monitoring (i.e., detect chip aging).

SUMMARY

One feature provides an integrated circuit that comprises a first plurality of ring oscillators configured to implement, in part, a physically unclonable function (PUF), a second plurality of ring oscillators configured to implement, in part, an age sensor circuit, and a ring oscillator selection circuit coupled to the first plurality of ring oscillators and the second plurality of ring oscillators, where the ring oscillator selection circuit is adapted to select at least two ring oscillator outputs from at least one of the first plurality of ring oscillators and/or the second plurality of ring oscillators, and wherein the ring oscillator selection circuit is commonly shared by the PUF and the age sensor circuit. According to one aspect, the integrated circuit further comprises an output function circuit adapted to receive and compare the two ring oscillator outputs and generate an output signal. According to another aspect, the first plurality of ring oscillators and the second plurality of ring oscillators include at least one commonly shared ring oscillator. According to yet another aspect, the selection circuit includes two or more selection switches that receive outputs from the plurality of first ring oscillators and the plurality of second ring oscillators, the selection switches selecting the at least two ring oscillator outputs.

According to one aspect, the selection circuit selects the at least two ring oscillator outputs in response to a challenge received by a processing circuit. According to another aspect, the selection circuit provides the at least two ring oscillator outputs to the processing circuit in response to the challenge. According to yet another aspect, the first plurality of ring oscillators implement the physically unclonable function by selectively enabling at least two ring oscillators of the first plurality of ring oscillators, wherein frequency variations due to manufacturing variations among the first plurality of ring oscillators generate a unique identifier. According to another aspect, the two ring oscillators selectively enabled are located at least 10 μm apart from one another.

According to one aspect, the second plurality of ring oscillators implement the age sensor circuit by continuously running a first ring oscillator of the second plurality of ring oscillators, maintaining a second ring oscillator of the second plurality of ring oscillators idle unless age detection is being ascertained, and ascertaining circuit age information by performing a differential frequency measurement between the first ring oscillator and the second ring oscillator. According to another aspect, the first and second ring oscillators of the second plurality of ring oscillators are located within 10 μm of each other. According to yet another aspect, pairs of continuously running ring oscillators and idled ring oscillators of the second plurality of ring oscillators are distributed across various parts of the integrated circuit to generate circuit reliability information local to the part of the integrated circuit where the pairs of continuously running and idled ring oscillators are located.

Another feature provides a method of manufacturing an integrated circuit that comprises providing a first plurality of ring oscillators configured to implement, in part, a physically unclonable function (PUF), providing a second plurality of ring oscillators configured to implement, in part, an age sensor circuit, providing a ring oscillator selection circuit, coupling the ring oscillator selection circuit to the first plurality of ring oscillators and the second plurality of ring oscillators, where the ring oscillator selection circuit is adapted to select at least two ring oscillator outputs from at least one of the first plurality of ring oscillators and/or the second plurality of ring oscillators, and sharing the ring oscillator selection circuit between the PUF and the age sensor circuit. According to one aspect, the method further comprises providing an output function circuit adapted to receive and compare the two ring oscillator outputs and generate an output signal. According to another aspect, the method further comprises sharing at least one ring oscillator between the first plurality of ring oscillators and the second plurality of ring oscillators. According to yet another aspect, the selection circuit includes two or more selection switches that are adapted to receive outputs from the plurality of first ring oscillators and the plurality of second ring oscillators, the selection switches selecting the at least two ring oscillator outputs. According to another aspect, the selection circuit is adapted to select the at least two ring oscillator outputs in response to a challenge received by a processing circuit.

According to one aspect, the selection circuit is adapted to provide the at least two ring oscillator outputs to the processing circuit in response to the challenge. According to another aspect, the first plurality of ring oscillators are adapted to implement the physically unclonable function by selectively enabling at least two ring oscillators of the first plurality of ring oscillators, wherein frequency variations due to manufacturing variations among the first plurality of ring oscillators generate a unique identifier. According to yet another aspect, the second plurality of ring oscillators are adapted to implement the age sensor circuit by continuously running a first ring oscillator of the second plurality of ring oscillators, maintaining a second ring oscillator of the second plurality of ring oscillators idle unless age detection is being ascertained, and ascertaining circuit age information by performing a differential frequency measurement between the first ring oscillator and the second ring oscillator. According to yet another aspect, the method further comprises distributing pairs of continuously running ring oscillators and idled ring oscillators of the second plurality of ring oscillators across various parts of the integrated circuit to generate circuit reliability information local to the part of the integrated circuit where the pairs of continuously running and idled ring oscillators are located.

Another feature provides an integrated circuit that comprises means for implementing a physically unclonable function (PUF), means for implementing an age sensor circuit, and means for selecting a signal coupled to the means for implementing the PUF and the means for implementing the age sensor circuit, where the means for selecting is adapted to select at least two signals output from at least one of the means for implementing the PUF and the means for implementing the age sensor circuit, wherein the means for selecting is commonly shared by the means for implementing the PUF and the means for implementing the age sensor circuit. According to one aspect, the integrated circuit further comprises means for comparing signals, the means for comparing adapted to receive and compare the two signals output from the at least one of the means for implementing the PUF and the means for implementing the age sensor circuit, the means for comparing generating an output signal. According to another aspect, the means for implementing the PUF and the means for implementing the age sensor circuit include at least one commonly shared ring oscillator. According to yet another aspect, the means for implementing the PUF is performed by selectively enabling at least two ring oscillators of the means for implementing the PUF, wherein frequency variations due to manufacturing variations among the first plurality of ring oscillators generate a unique identifier.

According to one aspect, the means for implementing the age sensor circuit is perform by continuously running a first ring oscillator of the means for implementing the age sensor circuit, maintaining a second ring oscillator of the means for implementing the age sensor circuit idle unless age detection is being ascertained, and ascertaining circuit age information by performing a differential frequency measurement between the first ring oscillator and the second ring oscillator. According to another aspect, pairs of continuously running ring oscillators and idled ring oscillators of the means for implementing the age sensor circuit are distributed across various parts of the integrated circuit to generate circuit reliability information local to the part of the integrated circuit where the pairs of continuously running and idled ring oscillators are located.

Another feature provides a computer readable storage medium having one or more instructions stored thereon, which when executed by at least one processor causes the processor to implement a physically unclonable function (PUF) with a first plurality of ring oscillators, implement an age sensor circuit with a second plurality of ring oscillators, and select at least two ring oscillator outputs from at least one of the first plurality of ring oscillators and/or the second plurality of ring oscillators using a ring oscillator selection circuit coupled to the first plurality of ring oscillators and the second plurality of ring oscillators, wherein the ring oscillator selection circuit is commonly shared by the PUF and the age sensor circuit.

Another feature provides an electronic device, comprising a plurality of components coupled to a bus, each component having an array of ring oscillators configured to implement (a) a physically unclonable function (PUF) to assist in generation of a unique identifier or key, and (b) an age sensor circuit that provides circuit age information for the corresponding component, and a processing circuit coupled to the bus, the processing circuit adapted to perform at least one of obtain age information for the one or more components, obtain the unique identifier or key for at least one of the components, and/or generate a second unique identifier or key by combining information obtained from two or more arrays of ring oscillators from different components. According to one aspect, each array of ring oscillators includes a first plurality of ring oscillators to implement the PUF and a second plurality of ring oscillators to implement the age sensor circuit. According to another aspect, each component further comprises a selection circuit that selects at least two ring oscillator outputs in response to a challenge received by the processing circuit. According to yet another aspect, each component further comprises an output function circuit adapted to receive compare the two ring oscillator outputs, generate an output signal based on the comparison, and provide the output signal to the processing circuit. According to another aspect, the selection circuit provides the two ring oscillator outputs to the processing circuit.

Another feature provides a method of manufacturing an electronic device that comprises providing a bus, providing a processing circuit, providing a plurality of components, each component having an array of ring oscillators configured to implement (a) a physically unclonable function (PUF) to assist in generation of a unique identifier or key, and (b) an age sensor circuit that provides circuit age information for the corresponding component, coupling the plurality of components to the bus, and coupling the processing circuit to the bus, the processing circuit adapted to perform at least one of obtain age information for the one or more components, obtain the unique identifier or key for at least one of the components, and/or generate a second unique identifier or key by combining information obtained from two or more arrays of ring oscillators from different components.

Another feature provides an electronic device that comprises a plurality of components coupled to a means for communicating, each component having a means for implementing a physically unclonable function (PUF) to assist in generation of a unique identifier or key, and a means for providing circuit age information for the corresponding component, and means for processing to the means for communicating, the means for processing adapted to perform at least one of obtain age information for the one or more components, obtain the unique identifier or key for at least one of the components, and/or generate a second unique identifier or key by combining information obtained from two or more means for implementing the PUF and means for providing circuit age information from different components.

Another feature provides a computer readable storage medium having one or more instructions stored thereon, which when executed by at least on processor causes the processor to cause a plurality of components coupled to a bus and each having an array of ring oscillators to implement (a) a physically unclonable function (PUF) to assist in generation of a unique identifier or key, and (b) an age sensor circuit that provides circuit age information for the corresponding component, and cause a processing circuit coupled to the bus to obtain age information for the one or more components, obtain the unique identifier or key for at least one of the components, and/or generate a second unique identifier or key by combining information obtained from two or more arrays of ring oscillators from different components.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. As used herein, the terms "chip health monitoring" or "health monitoring" simply refer to detecting the reliability and/or dependability issues of an IC and/or a module within an IC due to aging and/or use of the IC and/or the module within the IC.

Overview

One implementation provides a ring-oscillator (RO)-based circuit that provides both chip age detection and PUF capabilities (e.g., for generating unique identifiers/keys). That is, an age detection sensor and PUF may be implemented with the same ring oscillator circuit array by sharing one or more ring oscillator chains and/or a selector circuit. Integrating both of these security and chip health monitoring functions in a common or shared circuit reduces the area needed in a die.

Another aspect provides for implementing such dual-purpose ring oscillator circuit in multiple components within a host system. The host system is thus able to monitor the individual components to determine the overall health of the system and may also build security components (e.g., keys, identifiers, etc.) by combining outputs from two or more such ring oscillator circuits of different components.

Exemplary Mechanism

Figure 1:
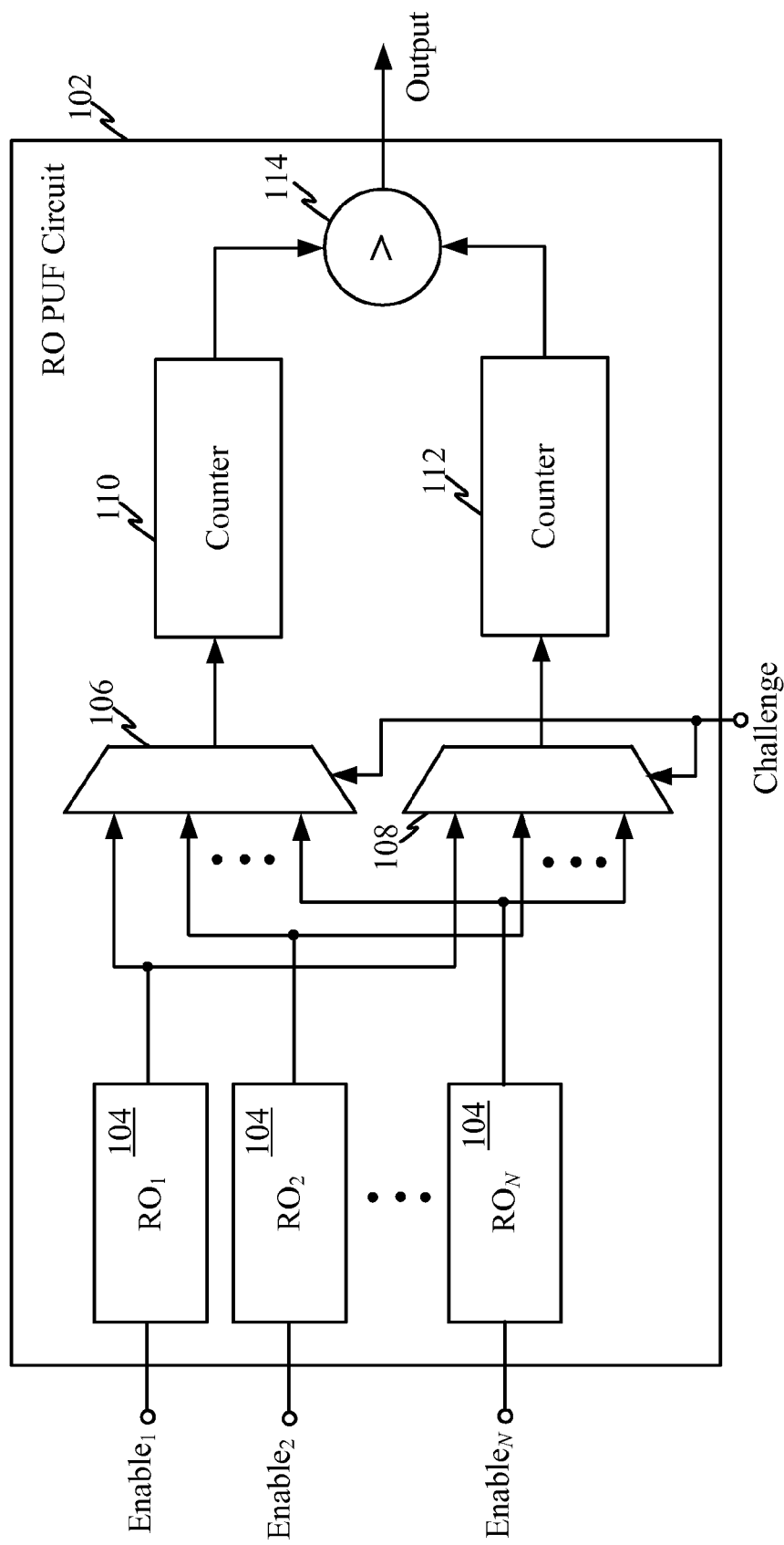
FIG. 1 illustrates a schematic block diagram of one example of a ring oscillator based PUF circuit found in the prior art.
Figure 2:
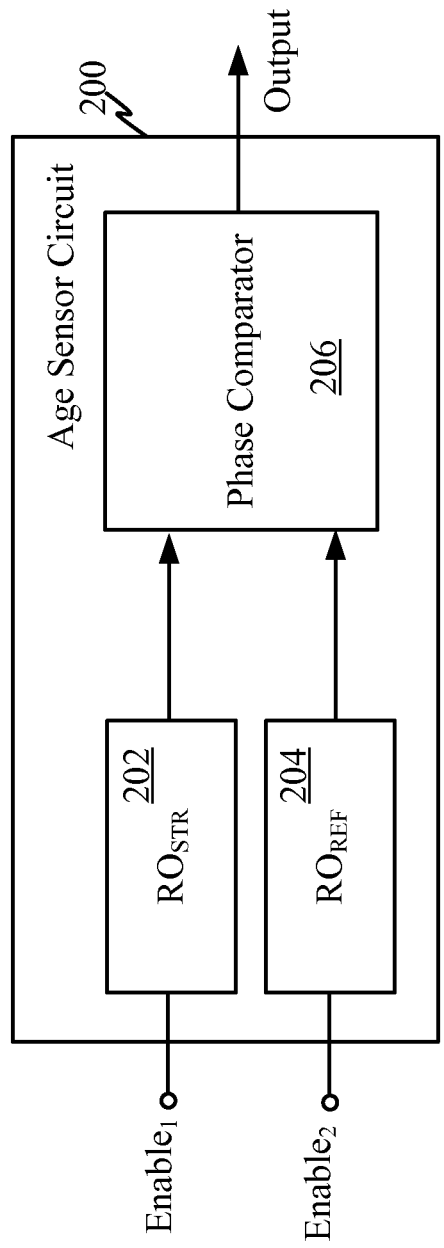
FIG. 2 illustrates a schematic block diagram of an IC age sensor circuit found in the prior art.
Figure 3:
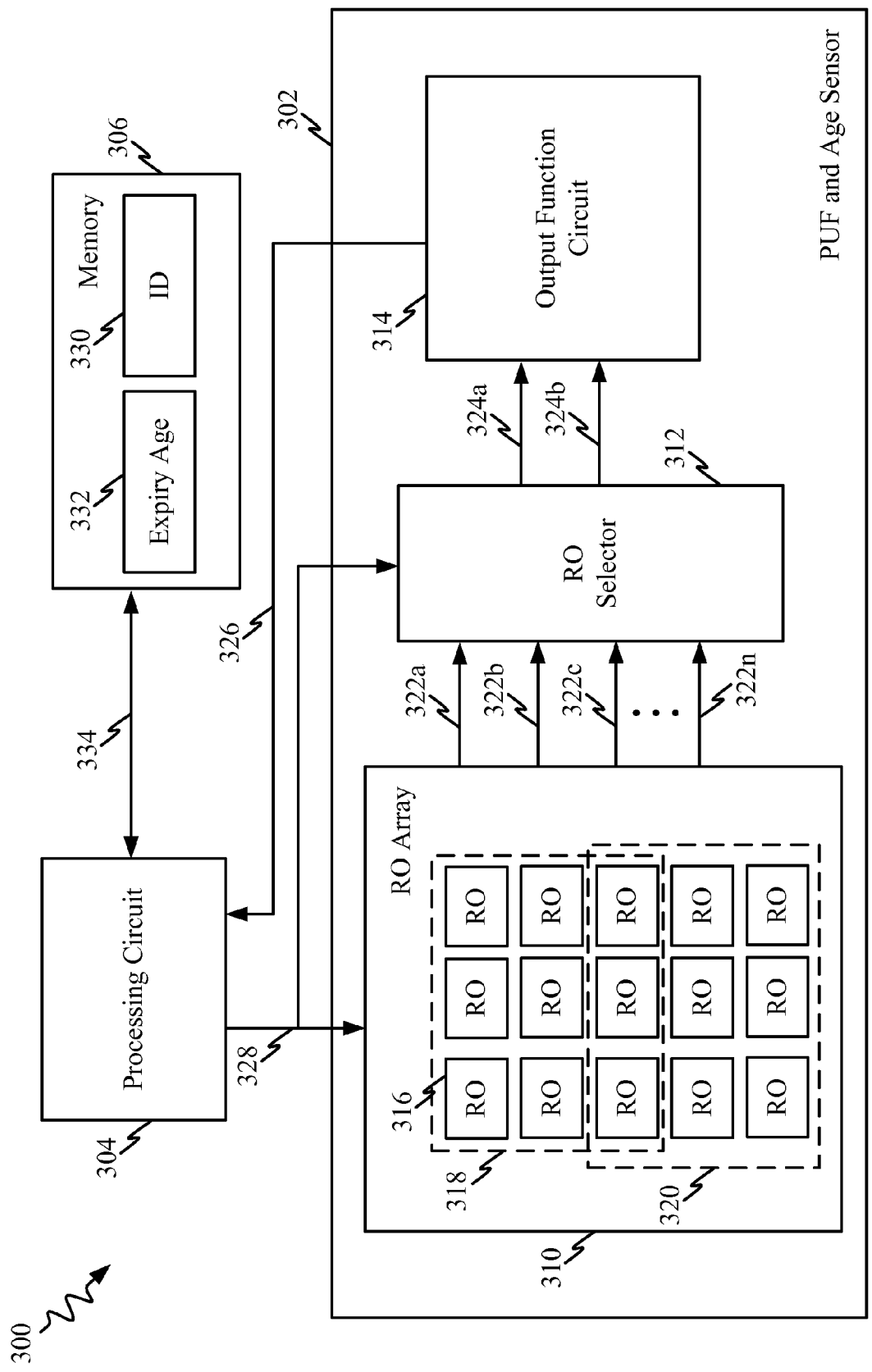
FIG. 3 illustrates a high-level schematic view of an exemplary chip identification and chip health monitoring apparatus.

FIG. 3 illustrates a high-level schematic view of an exemplary chip identification and chip health monitoring apparatus 300 according to one aspect of the disclosure. The apparatus 300 may include a PUF and age sensor circuit 302, a processing circuit 304, and/or a memory circuit 306.

The PUF and age sensor circuit 302 includes an RO array 310, an RO selector circuit 312 (e.g., means for selecting a signal), and an output function circuit 314 (e.g., means for comparing signals). The RO array 310 includes a plurality of ROs 316. A first grouping of ROs 316 may be associated with a PUF module 318, while a second grouping of ROs 316 may be associated with a chip age sensor module 320. Notably, one or more of the ROs 316 is associated with both the PUF module 318 and the chip age sensor module 320 (as indicated by the overlapping dashed lines of the modules 318, 320 that both encompass the same three ROs). The number of ROs 316 shown in the RO array 310 and associated with each module 318, 320 are merely exemplary.

The plurality of ROs 316 of the RO array 310 each have an output 322a, 322b, 322c, ..., 322n that represents its frequency. These frequency outputs are input into the RO selector circuit 312. The RO selector circuit 312 selects two (or more) of the RO frequencies 324a, 324b of the plurality of RO frequency outputs 322a, 322b, 322c, ..., 322n. For example, the selector circuit 312 may include one or more switches (e.g., multiplexers) that select the RO frequencies 324a, 324b. The RO frequencies 324a, 324b are then input into the output function circuit 314, which analyzes the two (or more) frequencies 324a, 324b and generates an output response 326. In one aspect, the output function circuit 314 may be a simple comparator circuit that changes its output signal (e.g., logical "1" or "0") depending on which of the two (or more) input frequencies 324a, 324b is greater. In other aspects, the output function circuit 314 may be increasingly complex such that it performs other analyses on the two (or more) input frequencies 324a, 324b to generate an output string 326.

Among other things, the processing circuit 304 generates a challenge 328 that serves as an input to the PUF and age sensor circuit 302. Specifically, the challenge 328 contains data that instructs the RO selector circuit 312 which of the two (or more) RO frequency outputs 322a, 322b, 322c, ... 322n to select as outputs 324a, 324b. The challenge 328 may also contain data that enables or disables (e.g., power ON or power OFF) select ROs 316 in the RO array 310. In one example, the challenge 328 may be a request for the PUF and age sensor circuit 302 to utilize its PUF capabilities to generate an identifier value. According to another example, the challenge 328 may be a request for the PUF and age sensor circuit 302 to utilize its circuit age sensing capabilities to provide chip health monitoring information. In either case, the processing circuit 304 receives a response 326 from the PUF and age sensor circuit 302 to its challenge 328.

According to one example, the memory circuit 306 may be, for example, read only memory (ROM) that stores a chip identifier 330 and/or a chip age value 332. The memory chip 306 may be communicatively coupled 334 to the processing circuit 304. For instance, the processing circuit 304 may issue a chip identification challenge 328 to the PUF and age sensor circuit 302. Using its PUF capabilities, the PUF and age sensor circuit 302 may generate a chip identifier value as a response 326 that is unique to the IC or IC submodule on which the PUF and age sensor circuit 302 resides. The processing circuit 304 may then compare the chip identifier value response 326 to the chip identifier 330 stored in the memory 306. If the two matches, then the IC and/or other software being executed on the processing circuit 304 may continue to operate normally, otherwise an error message may be generated and operability of the IC and/or processing circuit 304 may be suspended. As another example, the processing circuit 304 may issue a health monitoring challenge 328 to the PUF and age sensor circuit 302. Using its health monitoring capabilities, the PUF and age sensor circuit 302 may provide a circuit age information response 326 to the processing circuit 304. The processing circuit 304 may then compare the circuit age information response 326 to the expiration age 332 stored in the memory 306. If the circuit age information response 326 value does not exceed the expiration age 332, then the IC and/or other software being executed on the processing circuit 304 may continue to operate normally, otherwise an error message may be generated and operability of the IC and/or processing circuit 304 may be suspended.

Figure 4:
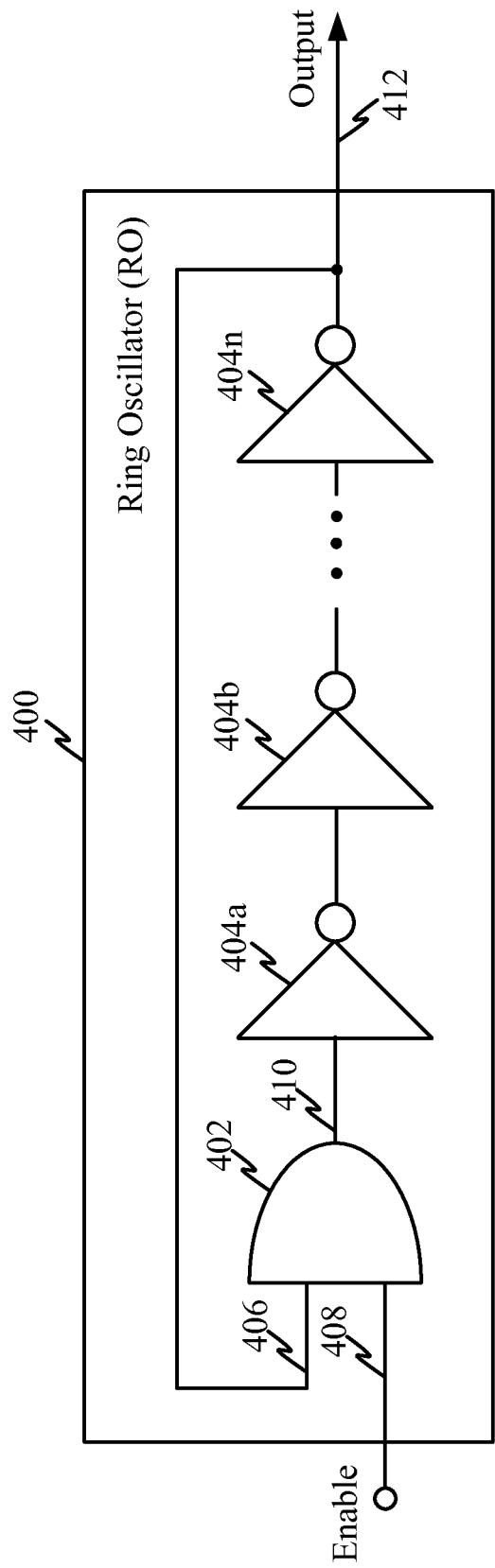
FIG. 4 illustrates a schematic block diagram of a ring oscillator.

FIG. 4 illustrates a schematic block diagram of a ring oscillator 400 according to one aspect. The RO 400 includes an AND gate 402 and an odd number of inverters 404a, 404b, ... 404n. The AND gate 402 has at least two input terminals 406, 408 and an output terminal 410. The AND gate's output terminal 410 may be input into the first inverter 404a. The inverters 404a, 404b, ... are then connected in series as shown. The output 412 of the RO 400 is then coupled to one of the input terminals 406 of the AND gate. The other input terminal 408 is coupled to an Enable signal that may be, for example, controlled by a processing circuit similar to the processing circuit 304 shown in FIG. 3. Referring to FIG. 4, if the RO 400 is sufficiently powered and the Enable signal is high (e.g., logical value "1"), the RO output 412 will toggle back and forth between logical values (i.e., toggle back and forth between "1" and "0").

Figure 5:
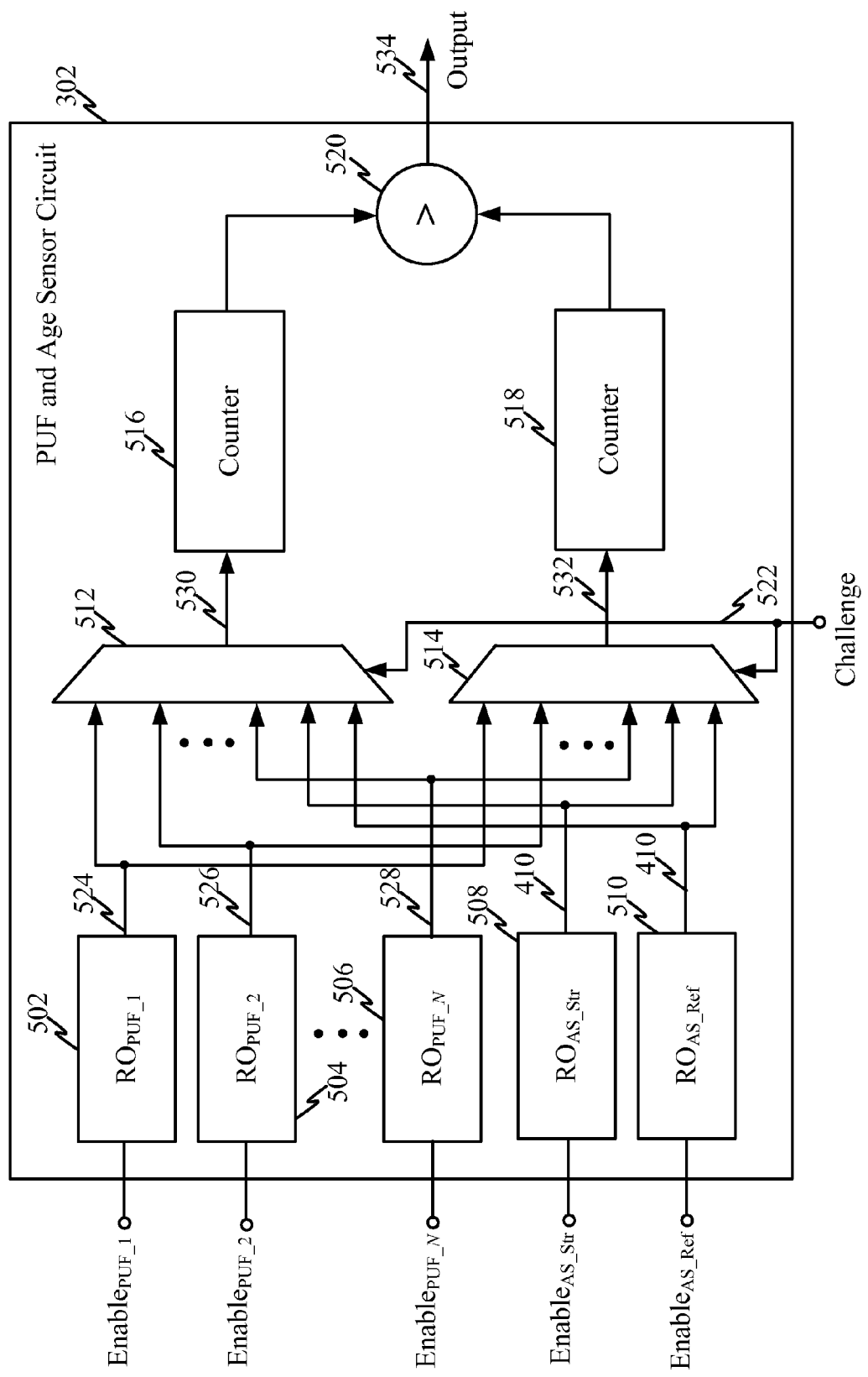
FIG. 5 illustrates a schematic block diagram of the PUF and age sensor circuit.

FIG. 5 illustrates a schematic block diagram of the PUF and age sensor circuit 302 according to one aspect. The circuit 302 includes a plurality of ROs 502, 504, 506, 508, 510, a first switch 512, a second switch 514, a first counter 516, a second counter 518, and a comparator 520. Referring to FIGS. 3 and 5, the plurality of ROs 502, 504, 506, 508, 510 may be, for example, the RO array 310. The switches 512, 514 may be, for example, the RO selector 312. Similarly, the counters 516, 518 and the comparator 520 may be, for example, the output function circuit 314. The ROs 502, 504, 506, 508, 510 may be, for example, the RO 400 shown in FIG. 4.

In the illustrated example, the ROs 502, 504, 506, 508, 510 may be classified/grouped into three types depending on their function. A first group consists of a first plurality of ROs 502, 504, 506 (e.g., means for implementing a PUF) that are primarily used for the PUF capability of the circuit 302. There may be N number of such ROs 502, 504, 506 where N is any positive integer greater than or equal to two. As just one example, N may be 512, 1024, or 2048. Notably, the PUF ROs 502, 504, 506 may be enabled selectively (i.e., sometimes turned ON and sometimes turned OFF) using one or more Enable signals shown in FIG. 5 (i.e., Enable$_{PUF\_1}$, Enable$_{PUF\_2}$, Enable$_{PUF\_3}$).

A second group consists of at least one RO 508 that is primarily used for health monitoring. This RO 508 is enabled a vast majority of the time, and is therefore labeled the "stressed RO." In one aspect, the stressed RO 508 may utilize a supply voltage $V_{DD\text{-}STR}$ that is greater than the nominal supply voltage $V_{DD}$ utilized by other circuitry, such as the PUF ROs 502, 504, 506. In another aspect, the stressed RO 508 may utilize the same nominal supply voltage $V_{DD}$ used by the other PUF ROs 502, 504, 506. A third group consists of at least one RO 510 that is primarily used for health monitoring. This RO 510 is disabled a vast majority of the time, and is therefore labeled the "idle reference RO." The stressed RO 508 and the idle reference RO 510 may be considered a second plurality of ROs and are a means for implementing an age sensor circuit.

In one mode of operation, the circuit 302 may utilize its PUF capabilities to generate a key or identifier. For example, the circuit 302 may receive a chip identifier or key generation challenge 522 from a processing circuit, such as the processing circuit 304 shown in FIG. 3. Referring to FIG. 5, the challenge 522 may cause two PUF ROs out of the plurality of PUF ROs 502, 504, 506 to be selectively activated/enabled by turning ON the appropriate Enable signals (e.g., two of $Enable_{PUF\_1}$, $Enable_{PUF\_2}$, ... $Enable_{PUF\_N}$). The challenge 522 will also cause the two switches 512, 514 to select and pass through the two different RO outputs of the plurality of outputs 524, 526, 528 that were selectively activated/enabled. Thus, each switch 512, 514 provides one PUF RO signal 530, 532 to a counter 516, 518. The frequency of the RO outputs 530, 532 serve to increase the values of their respective counters 316, 318. Due to small differences between the PUF ROs selected, the RO outputs 530, 532 will have slightly different frequencies. As such, the counters 516, 518 will change at different rates and have different counter values after a predefined period of time. The counters 516, 518 are then compared by the comparator circuit 520 and an output signal 534 is generated based on the comparison. For example, if the first counter's 516 value is greater than the second counter's 518 value, then a logical "1" may be generated, otherwise a logical "0" may be generated. This process may be performed a plurality of times, each time possibly selecting different PUF ROs 502, 504, 506 for comparison, until an identifier or key of sufficient length (e.g., bit string) is generated.

In another mode of operation, the circuit 302 may utilize its health monitoring capabilities to provide circuit age information of the IC or IC submodule on which the circuit 302 resides. For example, the circuit 302 may receive a chip age request challenge 522 from a processing circuit, such as the processing circuit 304 shown in FIG. 3. Referring to FIG. 5, the challenge 522 may cause the stressed RO 508 and the idle reference RO 510 to enter a measurement state. During the measurement state, the stressed RO 508 may continue to be enabled (i.e., still operational), however, it may utilize the nominal supply voltage $V_{DD}$ if it was ordinarily using the stress supply voltage $V_{DD\text{-}STR}$ (otherwise its supply voltage remains at $V_{DD}$). Furthermore, the idle reference RO 510 is enabled via $Enable_{AS\_Ref}$ (i.e., it powered ON using a nominal supply voltage $V_{DD}$) so that it becomes operational. The challenge 522 will also cause the two switches 512, 514 to select and pass through the outputs of the stressed and idle reference ROs 508, 510. Due to the fact that the stressed RO 508 remains operational most of the time its oscillating frequency decreases over time, whereas the idle reference RO's 510 oscillating frequency stays relatively the same since it is normally powered OFF. Thus, the output frequency difference between the stressed RO 508 and the idle reference RO 510 increases over the course of time. The outputs 530, 532 of these two ROs 508, 510 are then provided to the counters 516, 518 and the comparator 520 so that an output response signal 534 may be generated. For example, in this case the actual difference between the counter values 516, 518 may be output 534 to provide an estimate of the frequency difference between the two ROs 508, 510. The difference in values may be compared to empirically obtained data (e.g., stored in the memory circuit 306 in FIG. 3) to ascertain circuit age information of the IC or IC submodule as whole.

Even though the PUF ROs 502, 504, 506 may be only selectively enabled to conserve power (e.g., unlike the stressed RO 508 which is almost always power ON), their oscillating frequencies may also decrease over time through use. Consequently, the difference between the output frequencies of two PUF ROs may change over time with respect to one another. This difference may be extreme enough such that one PUF RO which previously had a lower oscillating frequency compared to another PUF RO may later have a slightly higher oscillating frequency compared to the same PUF RO. Thus, a challenge 522 that causes a comparison between these two PUF ROs may result in an output response 534 change (e.g., a bit flip at the output 534). Thus, the health monitoring capabilities of the circuit 302 may be used to detect which PUF ROs have undergone too much of a change in their original oscillating frequency such that they are no longer reliable (i.e., they are prone to cause bit flips at the output 534 when compared to other PUF ROs).

Therefore, according to another mode of operation, the circuit 302 may utilize its health monitoring capabilities to provide reliability information of a select PUF RO 502, 504, 506 path. For example, the circuit 302 may receive a path reliability request challenge 522 from a processing circuit, such as the processing circuit 304 shown in FIG. 3. Referring to FIG. 5, the challenge 522 may cause the desired PUF RO, for example PUF RO 504, to be enabled via $Enable_{PUF\_2}$, and the idle reference RO 510 to enter a measurement state (i.e., RO 510 is powered ON via $Enable_{AS\_Ref}$). The challenge 522 will also cause the two switches 512, 514 to select and pass through the outputs of the PUF RO 504 and idle reference RO 510. Due to the fact that the PUF RO's 504 oscillating frequency decreases over time (because of use), and the idle reference RO's 510 oscillating frequency remains substantially the same, the frequency difference between the PUF RO 504 and the idle reference RO 510 grows over time too. The outputs 530, 532 of these two ROs 504, 510 are then provided to the counters 516, 518 and the comparator 520 so that an output response signal 534 may be generated. For example, in this case the actual difference between the counter values 516, 518 may be output 534 to provide an estimate of the frequency difference between the two ROs 504, 510. The difference in values may be compared to originally obtained and stored frequency difference values of the two ROs 504, 510 and any significant change may be evaluated for projected PUF RO 504 path reliability issues.

FIG. 5 illustrates a single stressed RO 508 and a single reference RO 510. However, the PUF and age sensor circuit 302 may comprise a plurality of stressed ROs and a plurality of reference ROs. For example, a plurality of stressed and/or reference ROs may be distributed across various physical parts of an IC. Since different parts of an IC may be subject to different stresses, some parts of the IC may experience more pronounced aging effects. For example, different areas of the IC may experience different process variations on the die, different fluctuations in temperature, and/or different fluctuations in supply voltage. These effects may cause additional stress to some circuit components located in certain areas of the IC. Therefore, placing stressed and reference ROs (like the ROs 508, 510) in different parts/areas of the IC may help quantify aging effects local to the area of placement, and may help detect defective key or identifier generation of PUF ROs that have undergone serious aging and are no longer reliable. According to one aspect, a pair of stressed and reference ROs may be placed very close (e.g., less than 10 μm apart) to one another to minimize initial frequency differences. According to another aspect, the pair of stressed and reference ROs may be placed and/or selected so that they are far (e.g., greater than 10 µm apart).

Moreover, the plurality of PUF ROs 502, 504, 506 may be placed at various parts of an IC. When two different PUF ROs are selected for comparison to generate a key/identifier bit as described above, the PUF ROs selected may come from different parts of the IC. That is, the challenge 522 may specifically select two different PUF ROs that are located physically apart from one another by at least a certain threshold distance instead of two PUF ROs that are physically laid out right next to one another. As described in the aforementioned paragraph, different areas of the IC may experience different process variations on the die, different fluctuations in temperature, and/or different fluctuations in supply voltage. Thus, two PUF ROs that are physically further from one another may have a greater difference between their operational frequencies than two PUF ROs that are physically close to each other (e.g., right next to each other) since the former pair may experience greater manufacturing variation. Therefore, two PUF ROs may be selected for key/identifier generation from different parts of the IC to increase the probability that their operating frequencies may be better distinguishable. For example, the two PUF ROs selected may be at least 10 µm, 50 µm, 100 µm, 200 µm, 500 µm, or 1000 µm apart on the IC.

Figure 6:
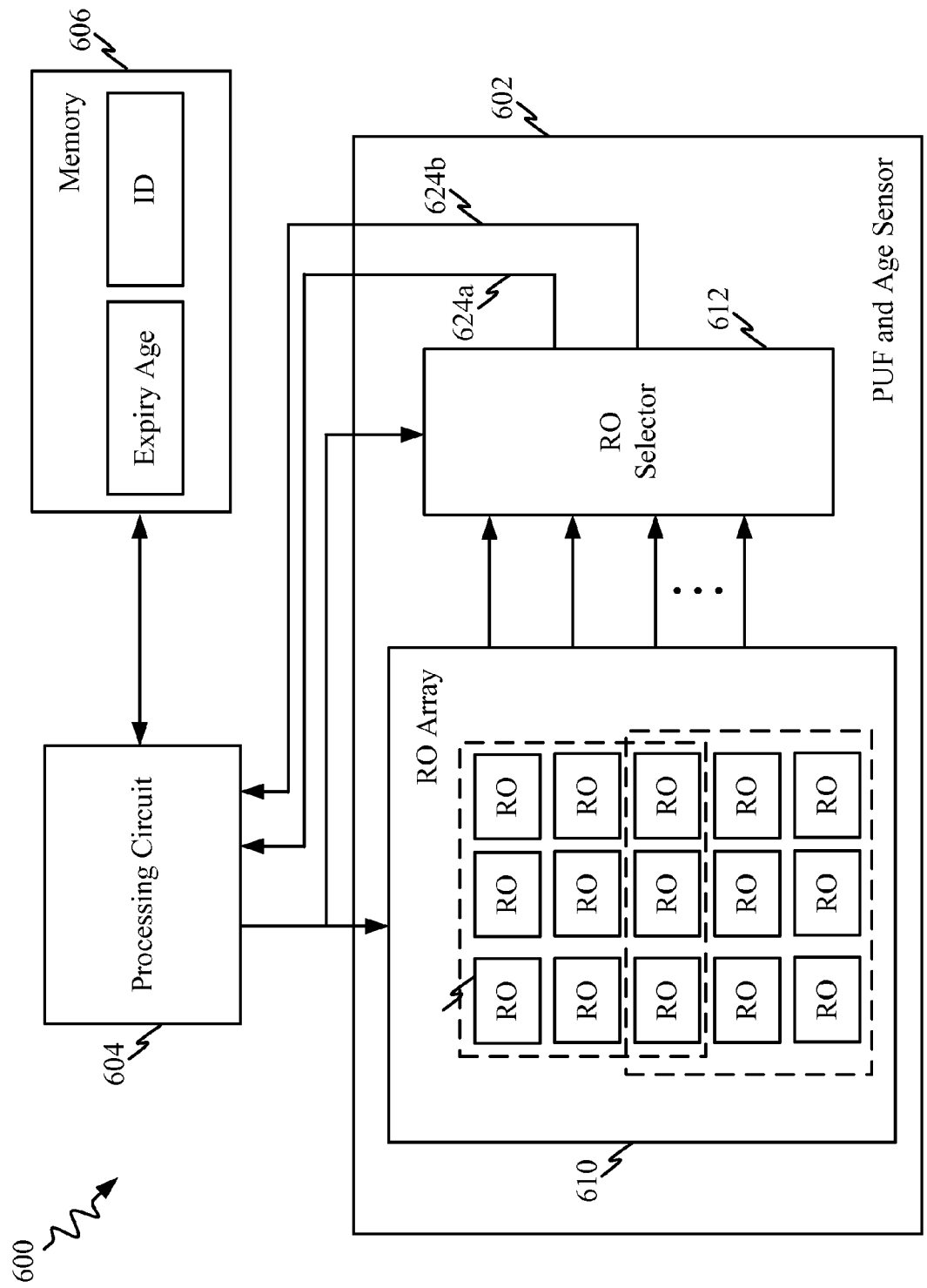
FIG. 6 illustrates a schematic block diagram of a chip identification and chip health monitoring apparatus.

FIG. 6 illustrates a schematic block diagram of a chip identification and chip health monitoring apparatus 600 according to another aspect. Like the apparatus 300 shown in FIG. 3, the apparatus 600 illustrated in FIG. 6 also includes a PUF and age sensor circuit 602, a processing circuit 604, and a memory circuit 606 and performs the same operations as the apparatus 300 of FIG. 3. The PUF and age sensor circuit 602 shown in FIG. 6 is identical to the PUF and age sensor circuit 302 in FIG. 3 except that the PUF and age sensor circuit 602 of FIG. 6 lacks an output function circuit 314 that may include counters and comparators (see FIGS. 3 and 5). The PUF and age sensor circuit 602 includes an RO array 610 and an RO selector circuit 612. The RO selector circuit 612 outputs as a response two (or more) RO outputs 624a, 624b to the processing circuit 604, which may be a separate circuit from the PUF and age sensor circuit 602. The processing circuit 302 may perform the same functions carried out by output function circuit 314 for the PUF and age sensor circuit 600 of FIG. 6.

Figure 7:
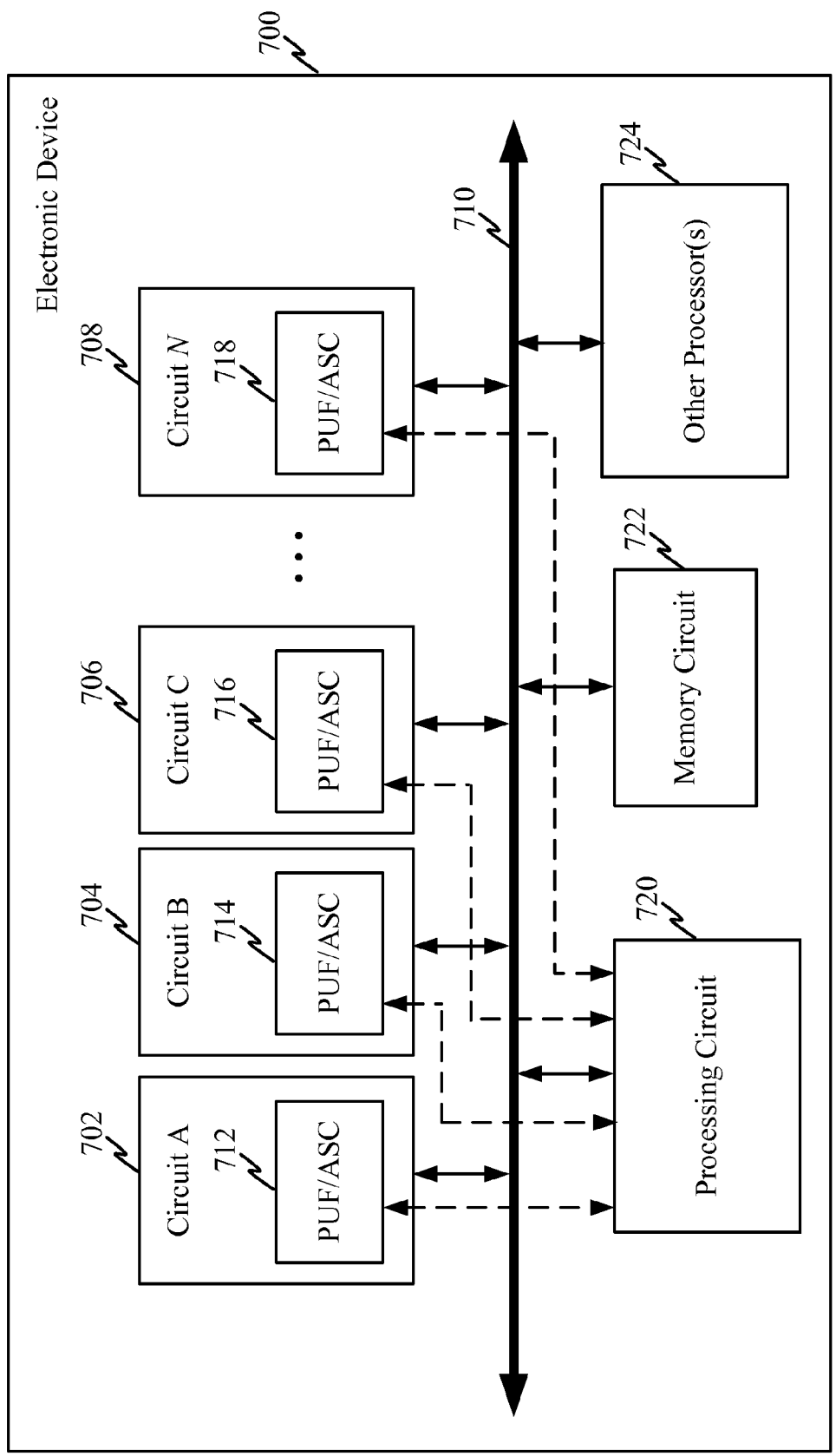
FIG. 7 illustrates a schematic block diagram of an electronic device.

FIG. 7 illustrates a schematic block diagram of an electronic device 700 according to one aspect. The electronic device 700 may be any digital electronic device having ICs, such as a mobile phone and a computer. The electronic device 700 includes a plurality of circuit modules 702, 704, 706, 708, the processing circuit 720, the memory circuit 722, other processor(s) 724, and one or more buses 710 that interconnect the aforementioned circuits. The circuit modules 702, 704, 706, 708 (also referred to herein as "components") may be separate ICs that perform different functions for the electronic device 700. For example, circuit A 702 may be a multimedia subsystem circuit, circuit B 704 may be a cryptography processing circuit, circuit C 706 may be a modem circuit, and circuit N 708 may be a low power audio circuit. Of course, the electronic device 700 may have many more circuit modules.

In the illustrated example, each circuit module 702, 704, 706, 708 includes its own PUF and age sensor circuit (PUF/ASC) 712, 714, 716, 718. The PUF/ASCs 712, 714, 716, 718 may be either the PUF and age sensor circuit 302 shown in FIG. 3 or the PUF and age sensor circuit 602 shown in FIG. 6. Since each circuit module 702, 704, 706, 708 includes its own PUF/ASC 712, 714, 716, 718, each circuit module 702, 704, 706, 708 may generate and provide key/identifiers and/or health monitoring information to the electronic device's processing circuit 720 (dashed double arrow lines indicate communication between modules 702, 704, 706, 708 and the processing circuit 720). The processing circuit 720 may verify the responses against data stored in the memory circuit 722.

According to one example, the PUF/ASCs 712, 714, 716, 718 are identical to the PUF and age sensor circuit 302 shown in FIG. 3. In this case, the processing circuit 720 may send a challenge to each PUF/ASC 712, 714, 716, 718 and the PUF/ASC 712, 714, 716, 718 will itself perform the necessary RO frequency comparisons and send back a response to the processing circuit 720. For example, the PUF/ASCs 712, 714, 716, 718 may generate a key or identifier string in response to a chip identifier or key generation challenge. As another example, the PUF/ASCs 712, 714, 716, 718 may provide circuit age information in response to a chip age/health request challenge. Such a locally generated output response processing scheme may be used, for example, if the number of modules 702, 704, 706, 708 is high (e.g., five or more) so as to minimize communications over the bus 710 between the modules 702, 704, 706, 708 and the processing circuit 720.

According to another example, the PUF/ASCs 712, 714, 716, 718 are identical to the PUF and age sensor circuit 602 shown in FIG. 6. In this case, the processing circuit 720 may send a challenge to each PUF/ASC 712, 714, 716, 718 and in response the processing circuit 720 will receive two (or more) RO outputs from the PUF/ASCs 712, 714, 716, 718. Then, the processing circuit 720 will perform the necessary RO frequency comparisons. For example, the PUF/ASCs 712, 714, 716, 718 may provide two RO outputs to the processing circuit 720 in response to a chip identifier or key generation challenge. The processing circuit 720 will then generate the key or identifier string itself based on these RO outputs it receives. Such a centrally located output response processing scheme may be used, for example, if the number of modules 702, 704, 706, 708 is low (e.g., four or less) since communicating the RO outputs from the modules 702, 704, 706, 708 to the processing circuit 720 will not be cumbersome from a timing and/or power consumption standpoint.

Such a distributed system of PUF/ASCs 712, 714, 716, 718 on each chip allows the processing circuit 720 to determine if any one of the circuit modules 702, 704, 706, 708 may be unreliable due to age. It also allows the processing circuit 720 to generate a key or identifier (e.g., a second unique identifier or key) based on responses from several different PUF/ASCs 712, 714, 716, 718 instead of just one. This allows for greater entropy and a more secure key or identifier generation.

Figure 8:
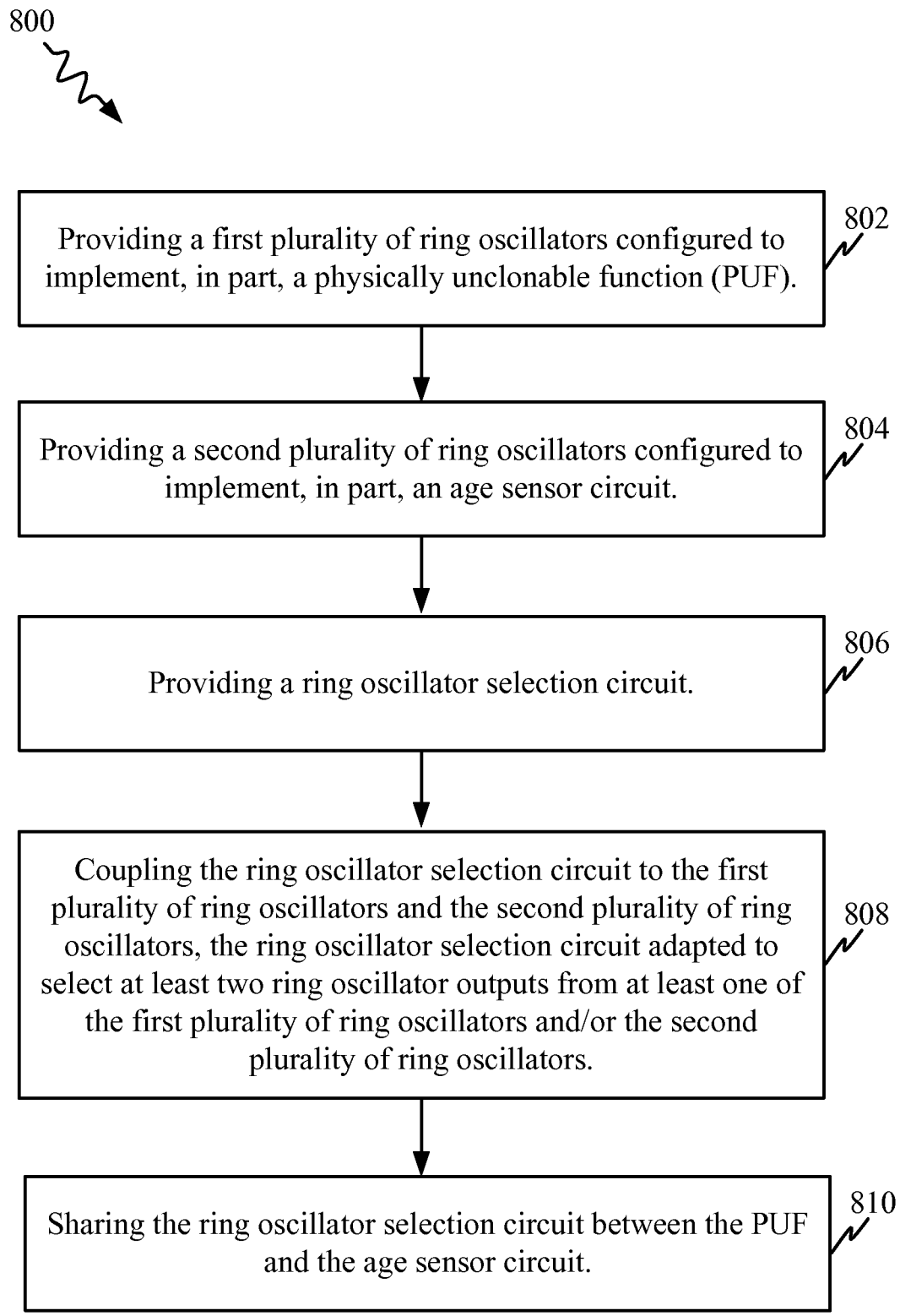
FIG. 8 illustrates a method of manufacturing an integrated circuit.

FIG. 8 illustrates a method 800 of manufacturing an integrated circuit according to one aspect of the disclosure. First, a first plurality of ring oscillators configured to implement, in part, a physically unclonable function (PUF) is provided 802. Next, a second plurality of ring oscillators configured to implement, in part, an age sensor circuit is provided 804. Next, a ring oscillator selection circuit is provided 806. Next, the ring oscillator selection circuit is coupled to the first plurality of ring oscillators and the second plurality of ring oscillators, where the ring oscillator selection circuit is adapted to select at least two ring oscillator outputs from at least one of the first plurality of ring oscillators and/or the second plurality of ring oscillators 808. Finally, the ring oscillator selection circuit is shared between the PUF and the age sensor circuit 810.

Figure 9:
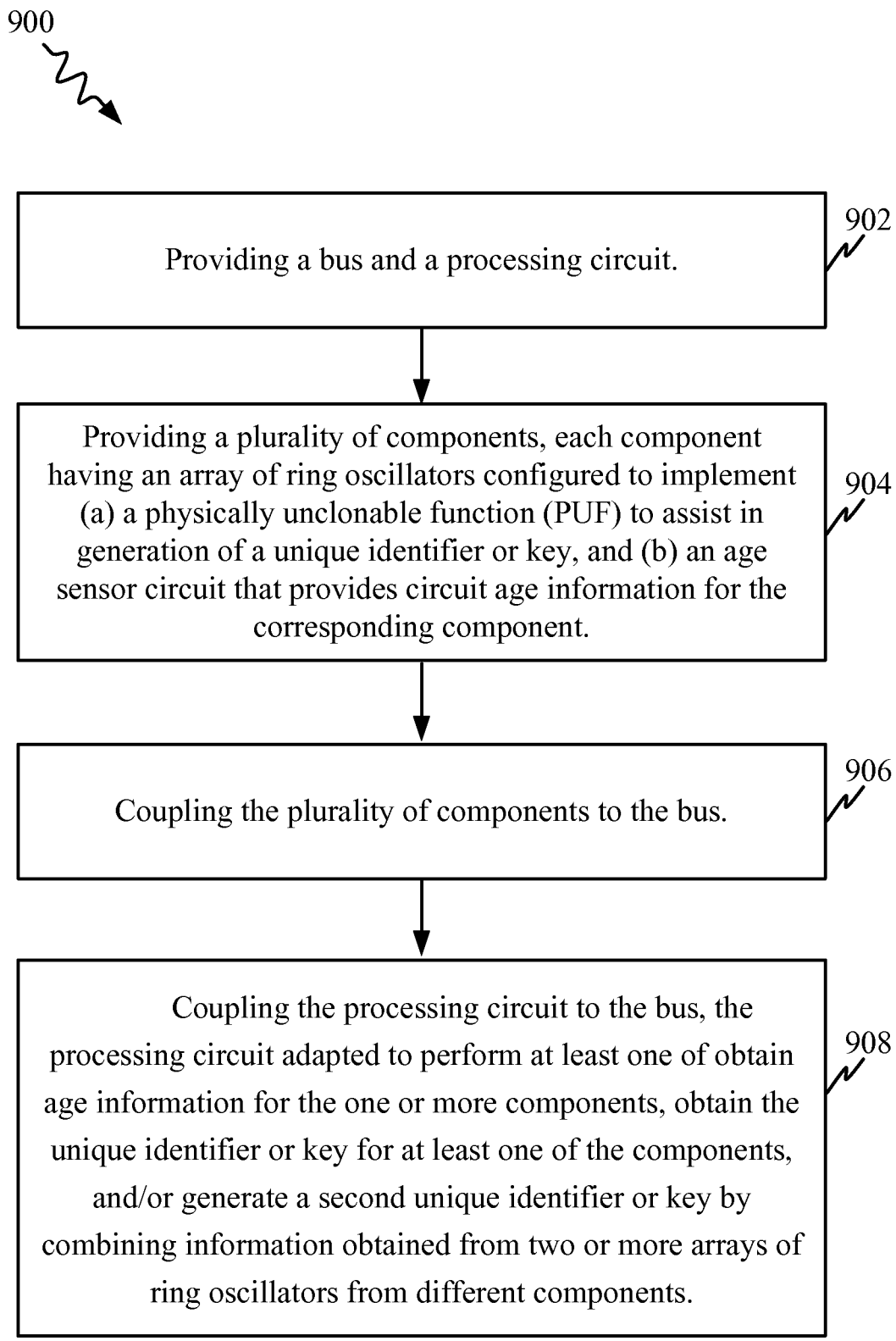
FIG. 9 illustrates a method of manufacturing an electronic device.

FIG. 9 illustrates a method 900 of manufacturing an electronic device according to one aspect of the disclosure. First, a bus and a processing circuit are provided 902. Next, a plurality of components are provided, where each component has an array of ring oscillators configured to implement (a) a physically unclonable function (PUF) to assist in generation of a unique identifier or key, and (b) an age sensor circuit that provides circuit age information for the corresponding component 904. Next, the plurality of components are coupled to the bus 906. Next, the processing circuit is also coupled to the bus, where the processing circuit is adapted to perform at least one of obtain age information for the one or more components, obtain the unique identifier or key for at least one of the components, and/or generate a second unique identifier or key by combining information obtained from two or more arrays of ring oscillators from different components 908.

One or more of the components, steps, features, and/or functions illustrated in FIGS. 3-9 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 3-7 may be configured to perform one or more of the methods, features, or steps described in FIGS. 8 and 9. The algorithms described herein may also be efficiently implemented in software and/or embedded in hardware.

Moreover, in one aspect of the disclosure, the processing circuit 304, 604 illustrated in FIGS. 3 and 6 may be specialized processors (e.g., an application specific integrated circuit (e.g., ASIC)) that are specifically designed and/or hard-wired to perform the algorithms, methods, and/or steps described in FIG. 8. Thus, such a specialized processor (e.g., ASIC) may be one example of a means for executing the algorithms, methods, and/or steps described in FIG. 8. Moreover, in another aspect of the disclosure, the processor 724 illustrated in FIG. 7 may be a specialized processor (e.g., an application specific integrated circuit (e.g., ASIC)) that is specifically designed and/or hard-wired to perform the algorithms, methods, and/or steps described in FIG. 9. Thus, such a specialized processor (e.g., ASIC) may be one example of a means for executing the algorithms, methods, and/or steps described in FIG. 9.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. An integrated circuit, comprising:
   a first plurality of ring oscillators configured to implement, in part, a physically unclonable function (PUF);
   a second plurality of ring oscillators configured to implement, in part, an age sensor circuit; and
   a ring oscillator selection circuit coupled to the first plurality of ring oscillators and the second plurality of ring oscillators, the ring oscillator selection circuit adapted to select at least two ring oscillator outputs from at least one of the first plurality of ring oscillators and/or the second plurality of ring oscillators, wherein the ring oscillator selection circuit is commonly shared by the PUF and the age sensor circuit.

2. The integrated circuit of claim 1, further comprising:
   an output function circuit adapted to receive and compare the two ring oscillator outputs and generate an output signal.

3. The integrated circuit of claim 1, wherein the first plurality of ring oscillators and the second plurality of ring oscillators include at least one commonly shared ring oscillator.

4. The integrated circuit of claim 1, wherein the selection circuit includes two or more selection switches that receive outputs from the plurality of first ring oscillators and the plurality of second ring oscillators, the selection switches selecting the at least two ring oscillator outputs.

5. The integrated circuit of claim 1, wherein the selection circuit selects the at least two ring oscillator outputs in response to a challenge received by a processing circuit.

6. The integrated circuit of claim 5, wherein the selection circuit provides the at least two ring oscillator outputs to the processing circuit in response to the challenge.

7. The integrated circuit of claim 1, wherein the first plurality of ring oscillators implement the physically unclonable function by:
   selectively enabling at least two ring oscillators of the first plurality of ring oscillators, wherein frequency variations due to manufacturing variations among the first plurality of ring oscillators generate a unique identifier.

8. The integrated circuit of claim 7, wherein the two ring oscillators selectively enabled are located at least ten (10) μm apart from one another.

9. The integrated circuit of claim 1, wherein the second plurality of ring oscillators implement the age sensor circuit by:
   continuously running a first ring oscillator of the second plurality of ring oscillators;
   maintaining a second ring oscillator of the second plurality of ring oscillators idle unless age detection is being ascertained; and
   ascertaining circuit age information by performing a differential frequency measurement between the first ring oscillator and the second ring oscillator.

10. The integrated circuit of claim 9, wherein the first and second ring oscillators of the second plurality of ring oscillators are located within ten (10) μm of each other.

11. The integrated circuit of claim 9, wherein pairs of continuously running ring oscillators and idled ring oscillators of the second plurality of ring oscillators are distributed across various parts of the integrated circuit to generate circuit reliability information local to the part of the integrated circuit where the pairs of continuously running and idled ring oscillators are located.

12. A method of manufacturing an integrated circuit, the method comprising:
   providing a first plurality of ring oscillators configured to implement, in part, a physically unclonable function (PUF);
   providing a second plurality of ring oscillators configured to implement, in part, an age sensor circuit;
   providing a ring oscillator selection circuit;
   coupling the ring oscillator selection circuit to the first plurality of ring oscillators and the second plurality of ring oscillators, the ring oscillator selection circuit adapted to select at least two ring oscillator outputs from at least one of the first plurality of ring oscillators and/or the second plurality of ring oscillators; and
   sharing the ring oscillator selection circuit between the PUF and the age sensor circuit.

13. The method of claim 12, further comprising:
   providing an output function circuit adapted to receive and compare the two ring oscillator outputs and generate an output signal.

14. The method of claim 12, further comprising:
   sharing at least one ring oscillator between the first plurality of ring oscillators and the second plurality of ring oscillators.

15. The method of claim 12, wherein the selection circuit includes two or more selection switches that are adapted to receive outputs from the plurality of first ring oscillators and the plurality of second ring oscillators, the selection switches selecting the at least two ring oscillator outputs.

16. The method of claim 12, wherein the selection circuit is adapted to select the at least two ring oscillator outputs in response to a challenge received by a processing circuit.

17. The method of claim 16, wherein the selection circuit is adapted to provide the at least two ring oscillator outputs to the processing circuit in response to the challenge.

18. The method of claim 12, wherein the first plurality of ring oscillators are adapted to implement the physically unclonable function by:
   selectively enabling at least two ring oscillators of the first plurality of ring oscillators, wherein frequency variations due to manufacturing variations among the first plurality of ring oscillators generate a unique identifier.

19. The method of claim 18, wherein the two ring oscillators that are adapted to be selectively enabled are located at least ten (10) μm apart from one another.

20. The method of claim 12, wherein the second plurality of ring oscillators are adapted to implement the age sensor circuit by:
   continuously running a first ring oscillator of the second plurality of ring oscillators;
   maintaining a second ring oscillator of the second plurality of ring oscillators idle unless age detection is being ascertained; and
   ascertaining circuit age information by performing a differential frequency measurement between the first ring oscillator and the second ring oscillator.

21. The method of claim 20, wherein the first and second ring oscillators of the second plurality of ring oscillators are located within ten (10) μm of each other.

22. The method of claim 20, further comprising:
   distributing pairs of continuously running ring oscillators and idled ring oscillators of the second plurality of ring oscillators across various parts of the integrated circuit to generate circuit reliability information local to the part of the integrated circuit where the pairs of continuously running and idled ring oscillators are located.

23. An integrated circuit, comprising:
means for implementing a physically unclonable function (PUF);
means for implementing an age sensor circuit; and
means for selecting a signal coupled to the means for implementing the PUF and the means for implementing the age sensor circuit, the means for selecting adapted to select at least two signals output from at least one of the means for implementing the PUF and the means for implementing the age sensor circuit, wherein the means for selecting is commonly shared by the means for implementing the PUF and the means for implementing the age sensor circuit.

24. The integrated circuit of claim 23, further comprising:
means for comparing signals, the means for comparing adapted to receive and compare the two signals output from the at least one of the means for implementing the PUF and the means for implementing the age sensor circuit, the means for comparing generating an output signal.

25. The integrated circuit of claim 23, wherein the means for implementing the PUF and the means for implementing the age sensor circuit include at least one commonly shared ring oscillator.

26. The integrated circuit of claim 23, wherein the means for implementing the PUF is performed by:
selectively enabling at least two ring oscillators of the means for implementing the PUF, wherein frequency variations due to manufacturing variations among the first plurality of ring oscillators generate a unique identifier.

27. The integrated circuit of claim 23, wherein the means for implementing the age sensor circuit is perform by:
continuously running a first ring oscillator of the means for implementing the age sensor circuit;
maintaining a second ring oscillator of the means for implementing the age sensor circuit idle unless age detection is being ascertained; and
ascertaining circuit age information by performing a differential frequency measurement between the first ring oscillator and the second ring oscillator.

28. The integrated circuit of claim 27, wherein pairs of continuously running ring oscillators and idled ring oscillators of the means for implementing the age sensor circuit are distributed across various parts of the integrated circuit to generate circuit reliability information local to the part of the integrated circuit where the pairs of continuously running and idled ring oscillators are located.

29. A non-transitory computer readable storage medium having one or more instructions stored thereon, which when executed by at least one processor causes the processor to:
implement a physically unclonable function (PUF) with a first plurality of ring oscillators;
implement an age sensor circuit with a second plurality of ring oscillators; and
select at least two ring oscillator outputs from at least one of the first plurality of ring oscillators and/or the second plurality of ring oscillators using a ring oscillator selection circuit coupled to the first plurality of ring oscillators and the second plurality of ring oscillators, wherein the ring oscillator selection circuit is commonly shared by the PUF and the age sensor circuit.

30. The computer readable storage medium of claim 29, wherein the first plurality of ring oscillators and the second plurality of ring oscillators include at least one commonly shared ring oscillator.

31. An electronic device, comprising:
a plurality of components coupled to a bus, each component having an array of ring oscillators configured to implement (a) a physically unclonable function (PUF) to assist in generation of a unique identifier or key, and (b) an age sensor circuit that provides circuit age information for the corresponding component; and
a processing circuit coupled to the bus, the processing circuit adapted to perform at least one of
obtain age information for the one or more components,
obtain the unique identifier or key for at least one of the components, and/or
generate a second unique identifier or key by combining information obtained from two or more arrays of ring oscillators from different components.

32. The electronic device of claim 31, wherein each array of ring oscillators includes a first plurality of ring oscillators to implement the PUF and a second plurality of ring oscillators to implement the age sensor circuit.

33. The electronic device of claim 32, wherein the first plurality of ring oscillators and the second plurality of ring oscillators include at least one commonly shared ring oscillator.

34. The integrated circuit of claim 32, wherein each component further comprises a selection circuit that selects at least two ring oscillator outputs in response to a challenge received by the processing circuit.

35. The electronic device of claim 34, wherein each component further comprises:
an output function circuit adapted to receive
compare the two ring oscillator outputs,
generate an output signal based on the comparison, and
provide the output signal to the processing circuit.

36. The electronic device of claim 34, wherein the selection circuit provides the two ring oscillator outputs to the processing circuit.

37. A method of manufacturing an electronic device, the method comprising:
providing a bus;
providing a processing circuit;
providing a plurality of components, each component having an array of ring oscillators configured to implement (a) a physically unclonable function (PUF) to assist in generation of a unique identifier or key, and (b) an age sensor circuit that provides circuit age information for the corresponding component;
coupling the plurality of components to the bus; and
coupling the processing circuit to the bus, the processing circuit adapted to perform at least one of
obtain age information for the one or more components,
obtain the unique identifier or key for at least one of the components, and/or
generate a second unique identifier or key by combining information obtained from two or more arrays of ring oscillators from different components.

38. The method of claim 37, wherein each array of ring oscillators includes a first plurality of ring oscillators to implement the PUF and a second plurality of ring oscillators to implement the age sensor circuit.

39. The method of claim 38, wherein the first plurality of ring oscillators and the second plurality of ring oscillators include at least one commonly shared ring oscillator.

40. The method of claim 38, wherein each component further comprises a selection circuit that selects at least two ring oscillator outputs in response to a challenge received by the processing circuit.

41. The method of claim 40, wherein each component further comprises:
an output function circuit adapted to
compare the two ring oscillator outputs,
generate an output signal based on the comparison, and
provide the output signal to the processing circuit.

42. The method of claim 40, wherein the selection circuit provides the two ring oscillator outputs to the processing circuit.

43. An electronic device, comprising:
a plurality of components coupled to a means for communicating, each component having a means for implementing a physically unclonable function (PUF) to assist in generation of a unique identifier or key, and a means for providing circuit age information for the corresponding component; and
means for processing to the means for communicating, the means for processing adapted to perform at least one of
obtain age information for the one or more components,
obtain the unique identifier or key for at least one of the components, and/or
generate a second unique identifier or key by combining information obtained from two or more means for implementing the PUF and means for providing circuit age information from different components.

44. A non-transitory computer readable storage medium having one or more instructions stored thereon, which when executed by at least on processor causes the processor to:
cause a plurality of components coupled to a bus and each having an array of ring oscillators to implement (a) a physically unclonable function (PUF) to assist in generation of a unique identifier or key, and (b) an age sensor circuit that provides circuit age information for the corresponding component; and
cause a processing circuit coupled to the bus to
obtain age information for the one or more components,
obtain the unique identifier or key for at least one of the components, and/or
generate a second unique identifier or key by combining information obtained from two or more arrays of ring oscillators from different components.

* * * * *